United States Patent [19]

Shiroeda et al.

[11] Patent Number: 5,718,965
[45] Date of Patent: Feb. 17, 1998

[54] BIAXIALLY ORIENTED POLYAMIDE FILM HAVING SURFACE PROTRUSIONS

[75] Inventors: Terumoto Shiroeda; Shinji Fujita, both of Tsuruga; Tadashi Okudaira, Ohtsu, all of Japan

[73] Assignee: Toyo Boseki Kabushiki Kaisha, Osaka, Japan

[21] Appl. No.: 577,375

[22] Filed: Dec. 22, 1995

[30] Foreign Application Priority Data

Dec. 22, 1994 [JP] Japan ................... 6-320815

[51] Int. Cl.⁶ .................... B32B 5/16; B32B 27/34
[52] U.S. Cl. .................... 428/143; 428/149; 428/323; 428/331; 428/474.4; 428/475.5; 428/476.1; 428/476.9; 428/910
[58] Field of Search .................... 428/143, 149, 428/323, 331, 474.4, 475.5, 476.1, 476.9, 910

[56] References Cited

U.S. PATENT DOCUMENTS

| | | | |
|---|---|---|---|
| 3,995,084 | 11/1976 | Berger et al. | 428/35 |
| 4,693,932 | 9/1987 | Koze et al. | 428/323 |
| 4,818,581 | 4/1989 | Katoh et al. | 428/143 |
| 4,952,449 | 8/1990 | Okazaki et al. | 428/147 |
| 5,051,292 | 9/1991 | Katoh et al. | 428/141 |

FOREIGN PATENT DOCUMENTS

| | | |
|---|---|---|
| 0 347 646 | 12/1989 | European Pat. Off. . |
| 4103335 | 4/1992 | Japan . |
| 4128027 | 4/1992 | Japan . |

*Primary Examiner*—William Watkins
*Attorney, Agent, or Firm*—Morrison & Foerster LLP

[57] ABSTRACT

A biaxially oriented polyamide resin film superior in slip characteristics and transparency, which comprises a polyamide resin containing surface-forming fine particles in a proportion of 0.03–0.80% by weight of the film, the film surface having protrusions formed by the fine particles contained in a proportion of 200–1,000 protrusions/mm², and the area proportion of voids formed on the film surface being not more than 0.1%. The present invention provides a biaxially oriented polyamide resin film strong and superior in resistance to pinhole, laminating property and appearance, which is free of curling or peeling of laminated films (delamination) when subjected to boiling water treatment and which has superior properties as a packing material, particularly, a packing bag for retort-packed food.

6 Claims, No Drawings

BIAXIALLY ORIENTED POLYAMIDE FILM HAVING SURFACE PROTRUSIONS

FIELD OF THE INVENTION

The present invention relates to a novel polyamide drawn film. More particularly, the present invention relates to a transparent film having superior slip characteristics and superior handling property under high humidity environments, which is exemplified by a biaxially oriented polyamide resin film which is strong and superior in resistance to pinhole and curling caused by treatment with boiling water, which film being laminated with a film made from olefin resin such as polyethylene and polypropylene and being used as packing material for retort-packed food, and to manufacture thereof.

BACKGROUND OF THE INVENTION

A biaxially oriented polyamide resin film comprising nylon as a main component is strong and superior in gas barrier property, resistance to pinhole, transparency and printability, and widely used as packing materials for various kinds of foods such as liquid food, water-containing food, frozen food, retort-packed food, paste food, livestock meat food and marine food. In recent years, such film has been widely used as a packing material for retort-packed food.

The polyamide resin film used for such packing uses is generally printed and laminated with, for example, a film made from polyolefin resin such as polyethylene and polypropylene, and the obtained laminate is folded in two in parallel with a travel direction, heat-sealed at three sides and cut out to produce a three-sided bag with one open end, wherein the polyamide resin film forms a surface layer. The bag is charged with the above-mentioned food etc., sealed, heat-sterilized in boiling water and put on the market.

The conventional polyamide resin film clearly poses the following problems in terms of processability and quality. That is, the film softens by absorption of humidity under high humidity environments to show degraded slip property, because of which the film is subject to difficulties caused by insufficient slip property during handling and processing, particularly in the rainy season. With respect to the bag applied with a boiling water treatment, moreover, the bag is associated with the problem in that the four sides thereof are curled into S-shapes after heat-sterilization, thus markedly impairing the appearance of a packed product. There has heretofore existed no polyamide resin film which fully satisfies the above-mentioned requirements in properties.

For an improved slip characteristics of the polyamide resin film, there have been proposed the following methods.

(1) A method comprising adding fine particles such as silica and kaolin to a resin, allowing these fine particles to protrude out on the film surface upon drawing to form fine protrusions, thereby reducing the contact area between the films.

(2) A method comprising reducing the interaction of the contact parts of the films by adding, to a polyamide resin, an organic lubricant such as a bisamide compound of a higher fatty acid.

(3) A method comprising preparing the film into a multiple layer structure by coating, laminating, coextrusion and the like and forming, on the outermost layer, a layer improved in slip characteristics which is obtained by the above method (1) or (2).

It should be noted that the above method (1) requires a large amount of fine particles to form many protrusions on the surface of the film so as to secure satisfactory workability under high humidity conditions. Along therewith, the transparency of the film becomes low to become a fatal defect for packing uses which require beautiful appearance. The method (2) can improve slip characteristics with less decrease in transparency as compared with the method (1), whereas an increase in the amount of organic lubricant for achieving sufficient slip characteristics can lead to poor adhesion to other materials and wettability when laminating the film with other materials, thus possibly exerting adverse influence on processing such as printing, evaporation and lamination.

For resolving the problem of curling after heat-sterilization, for example, comprising reducing the curling phenomenon by specifying the properties of the polyamide resin film have been proposed as disclosed in Japanese Patent Unexamined Publication Nos. 4-103335 and 4-128027. However, such methods are associated with the following difficulties and hardly considered satisfactory to fulfill the need of the consumer. That is, the method disclosed in Japanese Patent Unexamined Publication No. 4-103335 intends to reduce the above-mentioned curling phenomenon by specifying the evaluation standard which is the product of boiling water shrinkage distortion proportion of the biaxially oriented polyamide resin film and rate of change in molecular orientation angle in the film width direction which is determined using microwave. While this method is successful to some degree in improving the curling phenomenon, it is insufficient with respect to the toughness and resistance to pinhole, thus leaving a room for an improvement including these aspects as well. Japanese Patent Unexamined Publication No. 4-128027 proposes suppressing the curling phenomenon by enhancing the heat resistance of the biaxially oriented polyamide resin film, specifically by decreasing the boiling water shrinkage proportion in all directions of the film to not more than about 3%. In order to increase the dimensional stability during boiling water treatment by this method, it is necessary to promote crystallization of the film materials by extremely elevating the temperature of heat-setting, or relax the tension of the molecular chains of the film-constituting polymer by excessively applying relaxation heat treatment after drawing. As a result, another problem in that the obtained film loses toughness and resistance to pinhole arises.

To sum, the conventional methods for improving curling phenomenon, which are applicable to biaxially oriented polyamide resin film impair, along with suppression of the curling phenomenon, other important, required properties, such as toughness and resistance to pinhole of the film.

SUMMARY OF THE INVENTION

The present invention has been made to resolve the above-mentioned problem, and aims at establishing a technique which satisfies various processability requirements for packing uses without impairing the superior properties possessed by the biaxially oriented polyamide resin film, and which reduces, as far as possible, curling phenomenon caused by the boiling water treatment.

The present invention has been accomplished by specifying the density of the protrusions formed by fine particles and the area proportion of the voids formed around said protrusions, whereby to impart slip characteristics to the polyamide resin film. According to the present invention, there is provided a biaxially oriented polyamide resin film superior in slip characteristics and transparency, which comprises a polyamide resin containing surface-forming fine particles in a proportion of 0.03–0.80% by weight of the film, the film surface having protrusions formed by the fine particles in a proportion of 200–1,000 protrusions/mm², and the area proportion of the voids formed on the film surface being not more than 0.1%.

The present invention has been accomplished by specifying the shrinkage characteristics of the polyamide resin film to reduce the curling phenomenon caused by the boiling water treatment of the film, wherein the biaxially oriented polyamide resin film simultaneously satisfies the following formulas (1) and (2):

$$3\% \leq BSx \leq 6\% \quad (1)$$

wherein BSx is the maximum boiling water shrinkage proportion among the boiling water shrinkage proportions measured in all directions, $$BSa \leq 1.5\% \quad (2)$$

wherein BSa is an absolute value of the difference between the boiling water shrinkage proportion in the direction forming an angle of +45° with the travel direction of the film, and that in the direction forming an angle of −45° therewith.

When the above-mentioned biaxially oriented polyamide resin film is laminated with a film made from a polyolefin resin such as polyethylene and polypropylene, it is preferable that the polyamide resin film satisfy the following formula (3) in addition to the above-mentioned formulas (1) and (2), whereby a superior strength of the laminate enduring the hot water treatment can be achieved:

$$1.505 \leq Nz \leq 1.520 \quad (3)$$

wherein Nz is an index of refraction in the direction of film thickness.

The production of the present invention affords a biaxially oriented polyamide resin film having the above-mentioned properties, and comprises drawing a substantially unoriented polyamide resin film or sheet 3 times or more respectively in the machine direction and transverse direction, wherein said drawing in the machine direction comprises at least two steps of drawing at a temperature higher than (the glass transition temperature of the above-mentioned biaxially oriented polyamide resin film+20)° C. but not exceeding (the cool crystallization temperature of the film+20)° C.

DETAILED DESCRIPTION OF THE INVENTION

The present invention is described in more detail in the following.

Particularly preferable polyamide resin to form the film of the present invention is a polyamide resin mainly comprising nylon. Examples of nylon include nylon-6, nylon-66, nylon-46, nylon-610, nylon-612, nylon-11 and nylon-12, with preference given to nylon-6. Examples of the polyamide resin mainly comprising nylon include that formed from nylon alone, copolymerization polyamides wherein the nylon is copolymerized with a small amount of a nylon salt of hexmethylenediamine and adipic acid or isophthalic acid or a nylon salt of methaxylylenediamine and adipic acid, and blends of the nylon and the nylon salt.

Of the above-mentioned polyamide resins, particularly preferred in the present invention is that having a relative viscosity of 2–3.5. The relative viscosity of the polyamide resin concerns the toughness and drawability of the obtained biaxially drawn film, wherein that having a relative viscosity of less than 2 tends to have insufficient impact strength and that having a relative viscosity exceeding 3.5 tends to show poor biaxial drawability due to the increase in the draw stress. When a polyamide resin having a relative viscosity in the range of from 2 to 3.5 is used, a biaxially oriented polyamide resin film having superior properties can be easily obtained without suffering from the above-mentioned undesirable tendencies. The relative viscosity here is the value determined using a solution of a polymer (0.5 g) dissolved in 97.5% sulfuric acid (50 ml) at 25° C.

These resins mainly composed of nylon may contain a small amount of known additives such as blocking resisting agent, antistatic agent, stabilizer and plasticizer, as long as the property of the polyamide resin is not adversely affected.

The surface-forming fine particles to be used in the present invention are contained in the biaxially oriented polyamide resin film in the proportion of 0.03–0.80% by weight, preferably 0.1–0.50% by weight, relative to the film. When the content is less than 0.03% by weight, slip characteristics under high humidity conditions cannot be sufficiently improved, whereas when the content exceeds 0.80% by weight, transparency of the film becomes unacceptably poor.

The biaxially oriented polyamide resin film of the present invention needs to have protrusions having a height of 0.27–2 μm, which protrusions being formed by the surface-forming fine particles, in a density of 200–1,000 protrusions/mm², preferably 250–800 protrusions/mm². When the protrusion density is less than 200 protrusions/mm², slip characteristics under high humidity conditions cannot be sufficiently improved.

It is also essential that the surface layer of the biaxially oriented polyamide resin film of the present invention have an area proportion of voids of not more than 0.1%, preferably not more than 0.06%. When it exceeds 0.1%, the transparency does not satisfy the requirement for packing uses.

The area proportion of the voids can be shown by the following formula:

$$\frac{\text{Area of voids appeared in the surface layer}}{\text{Observed area (0.15 mm}^2\text{)}} \times 100\ (\%)$$

Examples of the surface-forming fine particles to be used in the present invention, include inorganic particles such as silica, kaolin and zeolite, and organic polymer particles such as acrylic resin and polystyrene resin.

The preferable average particle size of the surface-forming fine particles to be used in the present invention is 0.5–5 μm, more preferably 1–3 μm. When the average particle size is less than 0.5 μm, a large amount of the particles is necessary to achieve fine slip characteristics and when it exceeds 5 μm, surface roughness of the film becomes so great that the appearance is impaired and the area proportion of voids on the film surface cannot be adjusted to not more than 0.1%.

The biaxially oriented polyamide resin film of the present invention comprises, as essential elements, a polyamide resin and fine particles for forming the surface. Various other additives such as lubricant, blocking preventive, heat stabilizer, antioxidant, antistatic agent, light resisting agent and impact resistance improver may be contained to the extent that the aforementioned properties are not impaired. It is particularly preferable to add organic lubricants capable of lowering the surface energy, to the extent that no problem is caused with respect to adhesive strength and wettability, since more superior slip characteristics and transparency can be afforded to the drawn film.

The biaxially oriented polyamide resin film of the present invention is obtained by biaxially drawing, in the machine and transverse directions, a substantially undrawn polyamide resin sheet or film by melt extrusion and the like. The film which has been biaxially drawn and heat-set as necessary should meet the formulas (1) and (2) mentioned above. When laminating this film with a film of polyolefin resin such as polyethylene and polypropylene, the formula (3) is also desirably fulfilled.

The requirements expressed in respective formulas are explained in the following.

$$3\% \leq BSx \leq 6\% \qquad (1)$$

wherein BSx is the maximum boiling water shrinkage proportion among the proportions measured in all directions, and is determined by the method to be mentioned later. This value being in the above-mentioned range ensures the heat resistance (sometimes referred to as laminating strength or resistance to delamination) of the biaxially oriented polyamide resin film when formed into a bag and subjected to hot water treatment, and is important when enhancing the toughness and resistance to pinhole of the film itself. When BSx is less than 3%, impact strength, which is one of the indices to show toughness and resistance to pinhole of the film, becomes insufficient. On the other hand, when it exceeds 6%, laminating fails and resistance to delamination during hot water treatment becomes insufficient. The more preferable range of BSx for enhancing the toughness, resistance to pinhole, laminating property and resistance to delamination is 3.5–5.0%.

$$BSa \leq 1.5\% \qquad (2)$$

wherein BSa is an absolute value of the difference between the boiling water shrinkage proportion in the direction forming an angle +45° with the travel direction of the film, i.e. longitudinal direction, and that in the direction forming an angle −45° therewith (hereinafter BSa may be referred to as diagonal difference of boiling water shrinkage proportion). BSa is deeply concerned with the curling phenomenon caused by the boiling water treatment. The biaxially oriented polyamide resin film of the present invention is, as mentioned above, laminated with, for example, a film of polyolefin resin such as polyethylene and polypropylene, and the obtained laminate is folded in two and heat-sealed at three sides to manufacture a bag. Accordingly, the upper and the lower surfaces of the bag have the same side of the surface material. Supposing the direction forming +45° with the travel direction of the film is A direction, the direction forming an angle −45° therewith is B direction, and the film is folded in two in parallel with the travel direction of the film, the directions A and B point the same direction. In other words, the diagonal difference in the boiling water shrinkage proportion of the biaxially oriented polyamide resin film means the difference between the shrinkage proportions of the upper and lower surfaces of the bag in the direction of diagonal line. The greater difference means easy bowing which causes greater degree of curling. According to the present invention, it has been confirmed that an S-shaped curling does not occur when said diagonal difference of the biaxially oriented polyamide resin film is set for not more than 1.5%, preferably not more than 1.2%, since, in this range, bowing of the bag can be suppressed to the possible extent during boiling water treatment.

$$1.505 \leq Nz \leq 1.520 \qquad (3)$$

wherein Nz is an index of refraction in the direction of the film thickness. This value practically determines the laminating strength and the appearance quality of the film, such as the presence or absence of non-uniform thickness. Accordingly, this requirement of the formula (3) is an important condition when said biaxially oriented polyamide resin film is laminated with another resin film such as polyolefin resin film. When Nz is less than 1.505, laminating strength with other resin film becomes insufficient to cause easy occurrence of delamination between the film and the laminating substrate due to boiling water treatment after bag-making. Nz gradually decreases in the process of biaxial drawing of the undrawn polyamide resin film. In other words, Nz is one of the indices of drawing, and greater Nz means insufficient drawing. When Nz exceeds 1.520, non-uniform thickness due to insufficient biaxial drawing is prominent to the extent that satisfactory appearance quality of the film cannot be obtained. The preferable range of Nz in consideration of both the laminating strength and the appearance quality of the film is 1.507–1.516.

The present invention has enabled manufacture of a packing bag having ensured high level toughness, resistance to pinhole, laminating strength and film quality, which bag being free of curling phenomenon due to the boiling water shrinkage, by specifying the BSx, BSa and Nz of the biaxially oriented polyamide resin film by the formulas (1), (2) and (3).

When a film having the above-mentioned property is desired, the longitudinal drawing is particularly important in the above-mentioned drawing process. By employing the longitudinal drawing conditions as set forth in the following, a biaxially oriented polyamide resin film having the above-mentioned desired properties can be obtained. That is, a substantially undrawn film is longitudinally drawn, in at least two steps, 3 times or more in total within the temperature range of from [the glass transition temperature (Tg) of the film material+20° C.] to [a cool crystallization temperature of the film material (Tcc)+20° C.]. It is preferable to maintain the temperature between the two steps of the two-step drawing at not less than the glass transition temperature (Tg). Such longitudinal drawing conditions facilitate the transverse drawing to follow and enable provision of biaxially oriented polyamide resin film satisfying the formulas (1) to (3), irrespective of the conditions set for transverse drawing and heat-setting.

When the temperature during the longitudinal drawing is less than [(Tg) of the film material+20° C.], the drawing stress becomes high to cause easy breakage during transverse drawing, and when it exceeds [(Tcc)+20° C.], advanced thermal crystallization and greater degree of non-uniform thickness pose problems. When said longitudinal drawing is performed in a single step, the above-mentioned effects of decreasing BSa cannot be obtained. Even a two-step longitudinal drawing may result in insufficient film strength in the machine direction when the total draw ratio is less than 3. In either case, a film having the properties intended by the present invention cannot be achieved. When the temperature of the film becomes lower than the glass transition temperature (Tg) of the film material in between the two steps in the above mentioned two-step longitudinal drawing, thermal crystallization proceeds during the re-heating in the second longitudinal drawing, which in turn causes frequent breakage during transverse drawing.

To the contrary, the longitudinal drawing under the conditions set forth above and conventional method for transverse drawing using a tenter and heat-setting thereafter result in a biaxially oriented polyamide resin film having the aforementioned desired properties.

The present invention is described in more detail by way of Examples. The present invention is not subject to any limitation imposed by the following Examples and can be practiced upon suitable modification within the scope commensurate with the description of the instant specification, which modifications being all encompassed in the scope of the present invention. The physical properties and the method for determining/evaluating such properties employed in the following Examples are as follows.

Slip characteristics of film under high humidity conditions

The kinetic coefficient of friction at 20° C. and under 75% RH is measured according to ASTM-D1894. A film having a kinetic coefficient of friction of not more than 1.2 is evaluated as having fine slip characteristics and superior workability under high humidity conditions.

Density of protrusions on the film surface

The film is subjected to aluminum evaporation on its surface in vacuo and single rings and multiple rings in a size having the protrusion height corresponding to 0.27–2 μm are counted in an area of 1.3 mm² with a two beam interference microscope equipped with a 0.54 μm wavelength filter. The density is expressed as the number of the rings per unit area.

Area proportion of voids included in the film surface

The film surface is observed with a metal microscope and the area of the voids appearing around the surface-forming fine particles added to the film surface is determined by a Luzex II-D type image processor manufactured by Nireko Corp. Then, the percentage of the area of voids relative to the observed area (0.15 mm²) is calculated.

Boiling water shrinkage proportion (BE), maximum value (BSx) thereof and diagonal difference BSa) thereof A biaxially oriented polyamide resin film is cut out in a 21 cm square and left standing at 23° C. and under 65% RH for not less than 2 hours. A 20 cm diameter circle is drawn around the center of the square specimen and straight lines passing through the center of the circle are drawn at 15° intervals in a clockwise direction from 0° to 165° starting from the machine direction (or film drawing direction) which is taken as 0°. The diameter in each direction is measured and taken as the length before measurement.

This specimen is heat-treated in boiling water for 30 minutes, taken out, wiped to remove water on the surface, air-dried and left standing at 23° C. and under 65% RH for not less than 2 hours. The length of the straight lines drawn above is measured and taken as the length after the treatment. The boiling water shrinkage proportion is calculated from the following formulas.

BS=[(length before treatment–length after treatment)/length before treatment]×100 (%)

BSx=greatest shrinkage value of the BS values measured at 15° intervals from 0° to 165°

BSa=absolute value (%) of the difference between the shrinkage proportions in the directions of 45° and 135° (i.e. 180°, –45°)

Index of refraction

Respective film samples are left standing at 23° C. and under 65% RH for not less than 2 hours, and measured using an Abbe refractometer 4T type manufactured by Atago Corp.

Impact strength (IP)

Respective film samples are left standing at 23° C. and under 65% RH for not less than 2 hours, and breaking strength is measured using a film impact tester TSS type manufactured by Toyo Seiki Seisakusho and a semi-sphere impactor having a diameter of 12.7 mm.

Laminating strength

A 15 μm thick, 400 mm wide biaxially oriented polyamide resin film is cut out by slitting from the part nearest to the edge of the wind-up roll and applied with an urethane AC agent (EL443 manufactured by Toyo Morton). A 15 μm thick LDPE (low density polyethylene) film is extruded thereon at 315° C. using a single test laminator manufactured by Modern Machinery. Then, a 40 μm thick LLDPE (linear low density polyethylene) film is laminated thereon to give a three layer laminate film of polyamide resin/LDPE/LLDPE.

This laminate film is cut out in a 15 mm wide, 200 mm long test sheet and subjected to peeling strength test between the polyamide resin layer and the LDPE layer at 23° C. and under 65% RH using a Tensilon UMT-II-500 manufactured by Toyo Boldwin. Stress rate is 10 cm/min, peeling angle is 180° and water is applied to the portion peeling takes place.

S-shaped curling of three-sided seal bag

Using a test sealer manufactured by Seibu Kikai, the above-mentioned laminate film is folded in two in parallel with the machine direction while being heat-sealed at 150° C. continuously for 20 mm on each edge in the machine direction. Then, the film is intermittently heat-sealed for 10 mm in the perpendicular direction to the machine direction at 150 mm intervals to give a 200 mm width semifinished product. The product is cut in the machine direction so that each edge has 10 mm sealed portion, and then cut in the perpendicular direction to the machine direction at the boundary sealed portion to give three-sided seal bags (seal width: 10 mm). Ten of such bags are heated for 30 minutes in boiling water and stored overnight at 23° C. and under 65% RH. These 10 bags are overlapped and applied with a load of 1 kg the entirety of the bags. The bags are stored overnight and the load is removed. The degree of bowing (S-shaped curl) is evaluated according to the following criteria.

⊚: no bowing
○: slight bowing
X: clear bowing
X X: remarkable bowing

Film forming condition

Evaluated based on the number of breakage when drawing is consecutively applied under the same conditions as in respective Examples for 2 hours.

Non-uniform thickness

The biaxially oriented polyamide resin film is cut into a 1 m (machine direction)×5 cm (transverse direction) strips and the thickness is measured using a thickness gauge K306C manufactured by Adachi Denki. Non-uniform thickness per 1 m is calculated by the following formula, and this calculation is repeated 5 times. The average value is taken as the average non-uniform thickness.

Non-uniform thickness (%)=[(maximum thickness–minimum thickness)/average thickness]×100

EXAMPLE 1

Nylon 6 obtained by ring-opening polymerization of ε-caprolactam in a 100 L batch polymerizer was used as a polyamide resin. The chips of said nylon 6 were extracted with hot water in a batch polymerizer to reduce the content of monomer and oligomer to 1% by weight. Then, it was dried until the water content became 0.1% by weight and put to use. The relative viscosity of the starting material nylon 6 and the drawn film as measured using a 96% conc. sulfuric acid solution at 20° C. was about 2.8 for both.

The surface-forming fine particles used in a proportion of 0.15% by weight based on the film were silica fine particles having a pore volume of 1.3 ml/g and average particle size of 2.5 μm. The particles were dispersed in an aqueous solution of ε-caprolactam, which was the starting material of nylon 6, by high speed stirrer, charged in a polymerizer and dispersed in the nylon 6 during polymerization process. Then, N,N'-ethylenebis(stearylamide) was added in a proportion 0.15% by weight of the nylon 6 and the mixture was melt-extruded at 260° C. from an extruder having a T die. A direct high voltage was applied and the extruded sheet was cool-solidified by electrostatically adhering same to a cooling roll at 30° C. to give a 200 μm thick, substantially unoriented sheet.

This sheet was drawn 1.7 times at 75° C. for a first longitudinal drawing and drawn at 70° C. for a second drawing while warming the sheet at 70° C., so that the total draw ratio became 3.3. The sheet was continuously led to a tenter where the sheet was transversely drawn 4 times at 130° C., which was followed by heat-setting at 210° C. and 4% transverse relaxing heat treatment, and the sheet was cooled. The both edges were removed by cutting to give a 15 μm thick biaxially oriented polyamide resin film.

EXAMPLE 2

In the same manner as in Example 1 except that the transverse draw ratio was set for 3.5, a biaxially oriented polyamide resin film was obtained.

COMPARATIVE EXAMPLE 1

In the same manner as in Example 1 except that the longitudinal drawing temperature was set for 65° C. and the sheet was longitudinally drawn 3.3 times in a first drawing step, a biaxially oriented polyamide resin film was obtained.

COMPARATIVE EXAMPLE 2

A biaxially oriented polyamide resin film was obtained by setting the longitudinal drawing temperature for 65° C., longitudinally drawing the sheet 2.8 times in a first drawing step, setting the transverse drawing temperature for 120° C. and draw ratio for 4.5, heat-setting the sheet at 205° C. and applying a 5% transverse relaxation heat treatment while blowing steam at 210° C.

COMPARATIVE EXAMPLE 3

In the same manner as in Comparative Example 1 except that, after the transverse relaxation heat treatment, reheating was applied while allowing free shrinkage in the transverse direction by passing the film through a 200° C. oven, a biaxially oriented polyamide resin film was obtained.

The properties of each film obtained in the above Examples, Reference Example and Comparative Examples are shown together in Table 1.

As is evident from Table 1, the films which satisfied all the requirements defined in the present invention showed fine results in all aspects of slip characteristics, transparency, impact strength, toughness, resistance to pinhole and laminating strength, and are almost free of S-shaped curl caused by boiling water treatment. In contrast, the films of Reference Example and Comparative Examples having the properties deviating from the range defined in the present invention failed to meet the slip characteristics and transparency. Moreover, the film of Comparative Example 1 showed frequent occurrence of S-shaped curling caused by boiling water treatment, the films of Comparative Examples 2 and 3 showed poor impact strength and the film of Preparative Example showed insufficient laminating strength. The overall assessment is that all these films are hardly put to practical use.

EXAMPLE 3, COMPARATIVE EXAMPLE 4 and 5

In the same manner as in Example 1 except that nylon-6 (relative viscosity: 3.1, Tg: 42° C., Tcc: 76° C.) containing MXD6 in a proportion of 4% by weight was used and the sheets were longitudinally drawn at a temperature shown in Table 2, biaxially oriented polyamide resin films were obtained. The respective films were examined for number of breakage and non-uniform thickness. The results are shown in Table 2.

TABLE 2

| | Draw temperature (°C.) | | Number of breakage | Non-uniform thickness (%) | | Evaluation |
|---|---|---|---|---|---|---|
| | 1st step | 2nd step | | longitud. direction | transverse direction | |
| Ex. 3 | 80 | 80 | 0 | 2.5 | 1.5 | o |
| Comp. Ex. 4 | 60 | 80 | 3 | 3.1 | 4.1 | x |
| Comp. Ex. 5 | 80 | 100 | 1 | 4.5 | 3.5 | x |

The biaxially oriented polyamide resin film of the present invention has superior surface properties in terms of slip characteristics and transparency, and is strong and superior in thermal and mechanical properties such as laminating property and heat stability during boiling water treatment. Accordingly, the film of the present invention has superior property as a packing material, particularly, as a packing bag for retort-packed food. In addition, such superior biaxially oriented polyamide resin film can be easily prepared according to the method of the present invention.

What is claimed is:

1. A biaxially oriented polyamide resin film, which comprises a polyamide resin containing surface-forming fine

TABLE 1

| | BSx (%) | BSa (%) | Nz | S-shaped curl | Impact strength (kg/cm) | Laminating strength (g/15 mm) | Surface protrusion density (number/mm$^2$) | Area proportion of voids (%) | Kinetic coefficient of friction (μd) (80% RH) | Evaluation |
|---|---|---|---|---|---|---|---|---|---|---|
| Example 1 | 4.2 | 1.2 | 1.510 | ⊙ | 11.4 | 200 | 300 | 0.03 | 0.80 | o |
| Example 2 | 3.8 | 1.4 | 1.512 | o | 10.7 | 210 | 350 | 0.04 | 0.75 | o |
| Comp. Ex. 1 | 3.5 | 2.4 | 1.509 | x | 10.5 | 190 | 130 | 0.12 | 1.62 | x |
| Comp. Ex. 2 | 2.5 | 1.4 | 1.503 | o | 8.9 | 105 | 160 | 0.13 | 1.43 | x |
| Comp. Ex. 3 | 2.0 | 1.0 | 1.508 | ⊙ | 7.3 | 170 | 180 | 0.15 | 1.41 | x | particles in a proportion of 0.03–0.80% by weight of the film, the film surface having protrusions formed by the fine particles in a proportion of 200–1,000 protrusions/mm$^2$, and the area proportion of voids formed on the film surface being not more than 0.1%.

2. The film of claim 1, wherein the fine particles are contained in the film in a proportion of 0.1–0.5% by weight of the film.

3. The film of claim 1, wherein the fine particles contained in the film have an average particle size of 0.5–5 µm.

4. The film of claim 1, wherein the fine particles contained in the film have an average particle size of 1–3 µm.

5. The film of claim 1, wherein the film surface has protrusions thereon in an amount of 250–800 protrusions/mm$^2$.

6. The film of claim 1, having an area proportion of voids formed on the film surface of not more than 0.06%.

* * * * *